(12) United States Patent
Matsui et al.

(10) Patent No.: US 6,963,030 B2
(45) Date of Patent: Nov. 8, 2005

(54) GROMMET STRUCTURE AND WIRE HARNESS

(75) Inventors: Tsuyoshi Matsui, Aichi-ken (JP); Shigemi Hashizawa, Aichi-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/017,072

(22) Filed: Dec. 21, 2004

(65) Prior Publication Data

US 2005/0139372 A1 Jun. 30, 2005

(30) Foreign Application Priority Data

Dec. 24, 2003 (JP) .......................... P2003-427777

(51) Int. Cl.[7] .............................................. H02G 3/18
(52) U.S. Cl. .................. 174/65 G; 174/65 R; 174/135; 174/151; 16/2.1; 248/56
(58) Field of Search ................... 174/65 G, 65 R, 174/135, 152 G, 153 G, 151, 65 SS; 248/56; 16/2.1, 2.2; 439/98, 462

(56) References Cited

U.S. PATENT DOCUMENTS 6,043,432 A * 3/2000 Gretz ....................... 174/65 R
6,680,437 B2 * 1/2004 Sato ......................... 174/65 G
6,822,165 B2 * 11/2004 Nishimoto ................. 174/65 G
6,825,416 B2 * 11/2004 Okuhara .................... 174/65 G
6,867,371 B2 * 3/2005 Daoud et al. ............. 174/65 G

FOREIGN PATENT DOCUMENTS

JP          11-232948          8/1999

* cited by examiner

Primary Examiner—Dhiru R. Patel
(74) Attorney, Agent, or Firm—Finnegan, Henderson, Farabow, Garrett, & Dunner, L.L.P.

(57) ABSTRACT

A grommet structure includes: braided wires (5) which are separated at an electric wire through hole (1a); an electric wire (W2) covered with the braided wire (5); an electric wire (W1) not covered with the braided wire (5); a grommet body (6) having electric wire fit press portions (9) into which the electric wires (W1) and (W2) are press fitted and a flange (10) integrally provided on the electric wire fit press portions (9); a pair of shield shell covers (7) and (8) having shield connecting portions (14) to which ends of the separated braided wires (5) are respectively connected and which sandwich the flange (10) of the grommet body (6) and which are fixed to a periphery of the electric wire through hole (1a) of a vehicle body panel (1); the grommet body (6) is provided with a water-block projection (11) which prevents water from passing and the lower shield shell cover (8) is provided with a waterproof packing (18) which prevents water from passing.

6 Claims, 7 Drawing Sheets

GROMMET STRUCTURE AND WIRE HARNESS

BACKGROUND OF THE INVENTION

1. Field of the Invention

The present invention relates to a grommet structure of a wire harness having an electric wire covered with a shield member, and to a wire harness to which this grommet structure is applied.

2. Description of the Related Art

When a wire harness is to be laid straddling inside and outside of a passenger room of an automobile, the wire harness is laid through a water-block grommet to prevent water existing outside of the passenger room from entering the inside of the passenger room via the wire harness. FIG. 1 shows an example of such a conventional grommet structure of the wire harness which is disclosed in a Patent brochure, Japanese Patent Application Laid-open No. Hei-11-232948.

As shown in FIG. 1, a wire harness WH includes electric wires W, and a grommet 50 added to the electric wire W. The grommet 50 comprises an electric wire holding portion 52 having an electric wire insertion hole 51 therein, a substantially conical panel crimping portion 53 which is integrally provided on the electric wire holding portion 52, and an inner peripheral holding portion 55 which is disposed on the inner peripheral side of the panel crimping portion 53 through space S. A shield charging chamber 54 is formed in the inner peripheral holding portion 55. The electric wires W are inserted into the insertion hole 51 and in this state, shield material 56 is charged into the shield charging chamber 54, and the charged shield material 56 is solidified to lay grommet 50 in the wire harness WH. The wire harness WH in which the grommet 50 is laid is passed through an electric wire through hole of a vehicle body panel (not shown), and an annular recess 53a of the panel crimping portion 53 is fitted to a peripheral edge of the electric wire through hole.

In the above structure, a water passing between the grommet 50 and the vehicle body panel is blocked by the fitting structure, and water pass between the electric wire W and the grommet 50 is blocked by the charged shield material 56. With this structure, it is possible to reliably block water.

In order to secure the electromagnetic shielding, a wire harness having a braided wire (shield member) covering an outer periphery of the electric wire is used in some cases. Since high voltage (e.g., 42V) is applied to a wire harness used in an electric automobile for example, a wire harness having an electric wire covered with a braided wire is used to prevent adverse influence caused by electromagnetic waves. When the wire harness having such a braided wire is laid in the grommet of the electric wire press fit structure, since water enter from a gap of the braided wire which is press fitted into the electric wire press-fit hole of the grommet, water cannot be blocked reliably. If the above conventional grommet is laid, since the shield material 56 enters the gap of the braided wire, water does not enter from the gap of the braided wire, and water can reliably be blocked.

According to the grommet structure of the conventional wire harness WH, since it is necessary to charge the shield material 56 into the shield charging chamber 54 of the grommet 50, there is a problem that the productivity is inferior.

SUMMARY OF THE INVENTION

The present invention has been archived in order to solve the above problem, and it is an object of the invention to provide a grommet structure capable of securing electromagnetic shielding against a wire harness having a wire covered with shield members and capable of reliably blocking water, and having excellent productivity.

It is another object of the invention to provide a wire harness to which the grommet structure is applied.

A first aspect of the present invention provides a grommet structure which includes: an electric wire covered at its outer periphery with the shield members which are separated at a position of an electric wire through hole of a mounting panel; a grommet body having an electric wire press fit portion into which the electric wire is press fitted and a flange integrally provided on the electric wire press fit portion; and a pair of shield shell covers which respectively includes shield connecting portions to which ends of the separated shield members are connected and which sandwich the flange of the grommet body and which are fixed to a periphery of the electric wire through hole of the mounting panel; wherein one of the grommet body and the pair of shield shell covers is provided with a first water-block to prevent water from passing between the grommet body and the pair of shield shell covers; and one of the mounting panel and the one of the shield shell covers which is in contact with the mounting panel is provided with a second water-block to prevent water from passing between the mounting panel and the one shield shell cover.

According to the grommet structure, the shield member of the electric wire is electrically connected to the mounting panel through the pair of shield shell cover. Water is reliably prevented from passing between the electric wire and the grommet body by the press fit structure built by the electric wire fit press portion, water is reliably prevented from passing between the grommet body and the pair of shield shell covers by the first water-block projection, and water is reliably prevented from passing between the pair of shield shell covers and the mounting panel by the second waterproof packings. Unlike the conventional technique, the grommet structure can be produced without charging the shield material.

In other words, according to the first aspect, the shield member of the electric wire is electrically connected to the mounting panel through the pair of shield shell cover. Therefore, the electromagnetic shielding path can be secured. Water is reliably prevented from passing between the electric wire and the grommet body by the press fit structure built by the electric wire fit press portion, water is reliably prevented from passing between the grommet body and the pair of shield shell covers by the first water-block projection, and water is reliably prevented from passing between the pair of shield shell covers and the mounting panel by the second waterproof packings. Unlike the conventional technique, it is unnecessary to charge the shield member, and the grommet structure can be produced only by assembling the parts. With this structure, electromagnetic shielding against (in comparison to) the wire harness having the electric wires covered with the braided wire (shield member) can be secured, water can reliably be blocked, and productivity is excellent.

A second aspect of the present invention provides the grommet structure according to the first aspect, wherein the second water-block is a waterproof packing which is provided on the shield shell cover and projecting toward the mounting panel.

According to this aspect, the second water-block can easily be provided as compared with a case where the mounting panel is provided with the second water-block.

A third aspect of the present invention provides the grommet structure according to the second aspect, wherein the waterproof packing is fixed to the shield shell cover by baking.

According to this aspect, the waterproof packing can easily be fixed.

A fourth aspect of the present invention provides the grommet structure according to the second aspect, wherein the waterproof packing is fixed to the shield shell cover by outsert molding.

According to this aspect, the waterproof packing can be fixed such that the waterproof packing is not easily fall and is not deviated in position.

A fifth aspect of the present invention provides the grommet structure according to the first aspect, wherein the first water-block is a water-block projection which is integrally formed on the grommet body and projects toward at least one of the shield shell covers.

According to this aspect, the first water-block can be produced at the same time by molding the grommet body. Therefore, the first water-block can be easily produced.

A sixth aspect of the present invention provides the grommet structure according to the first aspect, wherein the structure further comprises another electric wire which is not covered with a shield member in addition to the electric wire covered with the shield member, and the grommet body is provided with an electric wire fit press portion into which the electric wire not covered with a shield member is press fitted.

According to this aspect, the same effects as those described above can be obtained even if there exist the electric wire covered with the shield member and the electric wire not covered with the shield member.

A seventh aspect of the present invention provides a wire harness which includes: an electric wire covered at its outer periphery with the shield members which are separated at a position of an electric wire through hole of a mounting panel; a grommet having an electric wire press fit portion into which the electric wire is press fitted and a flange integrally provided on the electric wire press fit portion; and a pair of shield shell covers which respectively includes shield connecting portions to which ends of the separated shield members are connected and which sandwich the flange of the grommet and which are fixed to a periphery of the electric wire through hole of the mounting panel; wherein one of the grommet and the pair of shield shell covers is provided with a first water-block to prevent water from passing between the grommet and the pair of shield shell covers; and one of the mounting panel and the one of the shield shell covers which is in contact with the mounting panel is provided with a second water-block to prevent water from passing between the mounting panel and the one shield shell cover.

According to the wire harness, the shield member of the electric wire is electrically connected to the mounting panel through the pair of shield shell cover. Water is reliably prevented from passing between the electric wire and the grommet by the press fit structure built by the electric wire fit press portion, water is reliably prevented from passing between the grommet and the pair of shield shell covers by the first water-block projection, and water is reliably prevented from passing between the pair of shield shell covers and the mounting panel by the second waterproof packings. Unlike the conventional technique, the wire harness can be produced without charging the shield material.

In other words, according to the seventh aspect, the shield member of the electric wire is electrically connected to the mounting panel through the pair of shield shell cover. Therefore, the electromagnetic shielding path can be secured. Water is reliably prevented from passing between the electric wire and the grommet by the press fit structure built by the electric wire fit press portion, water is reliably prevented from passing between the grommet and the pair of shield shell covers by the first water-block projection, and water is reliably prevented from passing between the pair of shield shell covers and the mounting panel by the second waterproof packings. Unlike the conventional technique, it is unnecessary to charge the shield member, and the wire harness can be produced only by assembling the parts. With this structure of the wire harness, even though the wire harness includes the electric wires covered with the braided wire (shield member), electromagnetic shielding can be secured, water can reliably be blocked, and productivity is excellent.

BRIEF DESCRIPTION OF THE ACCOMPANYING DRAWINGS

DETAILED DESCRIPTION OF THE PREFERRED EMBODIMENTS

An embodiment of the present invention will be explained below with reference to the accompanying drawings.

Figure 1:
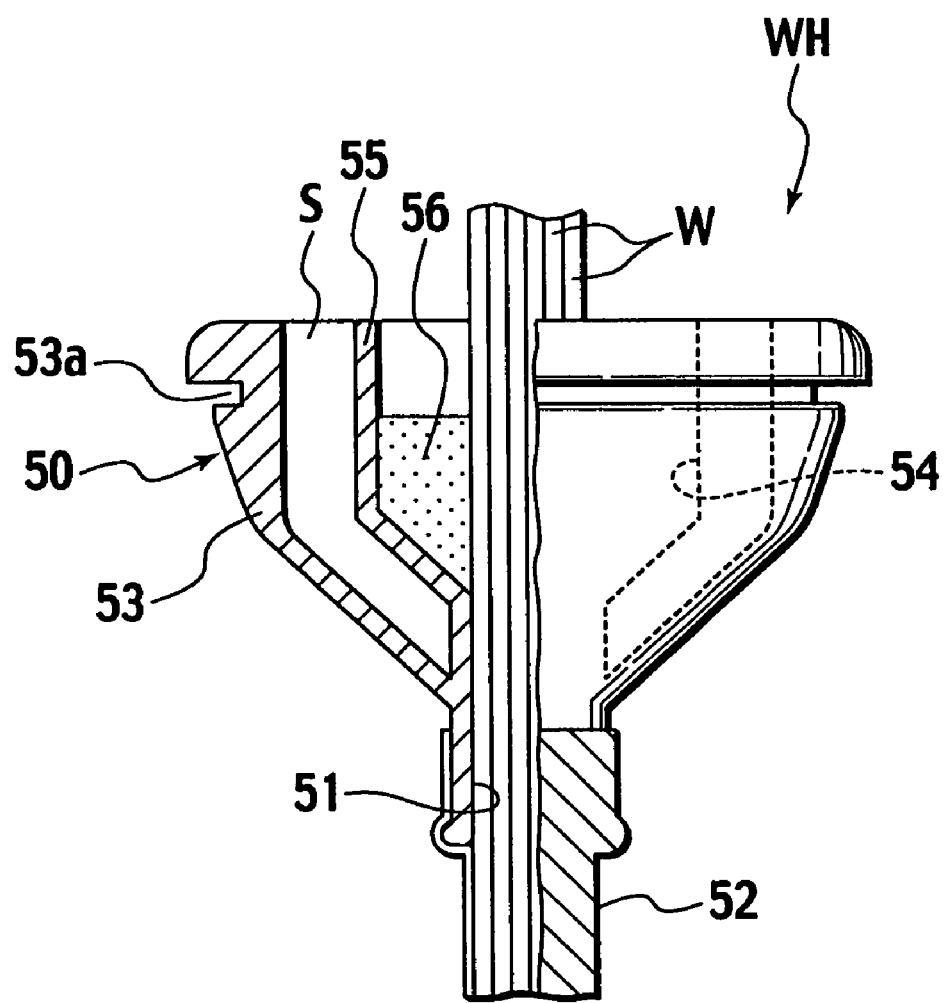
FIG. 1 is a sectional view showing a conventional grommet structure.
Figure 2:
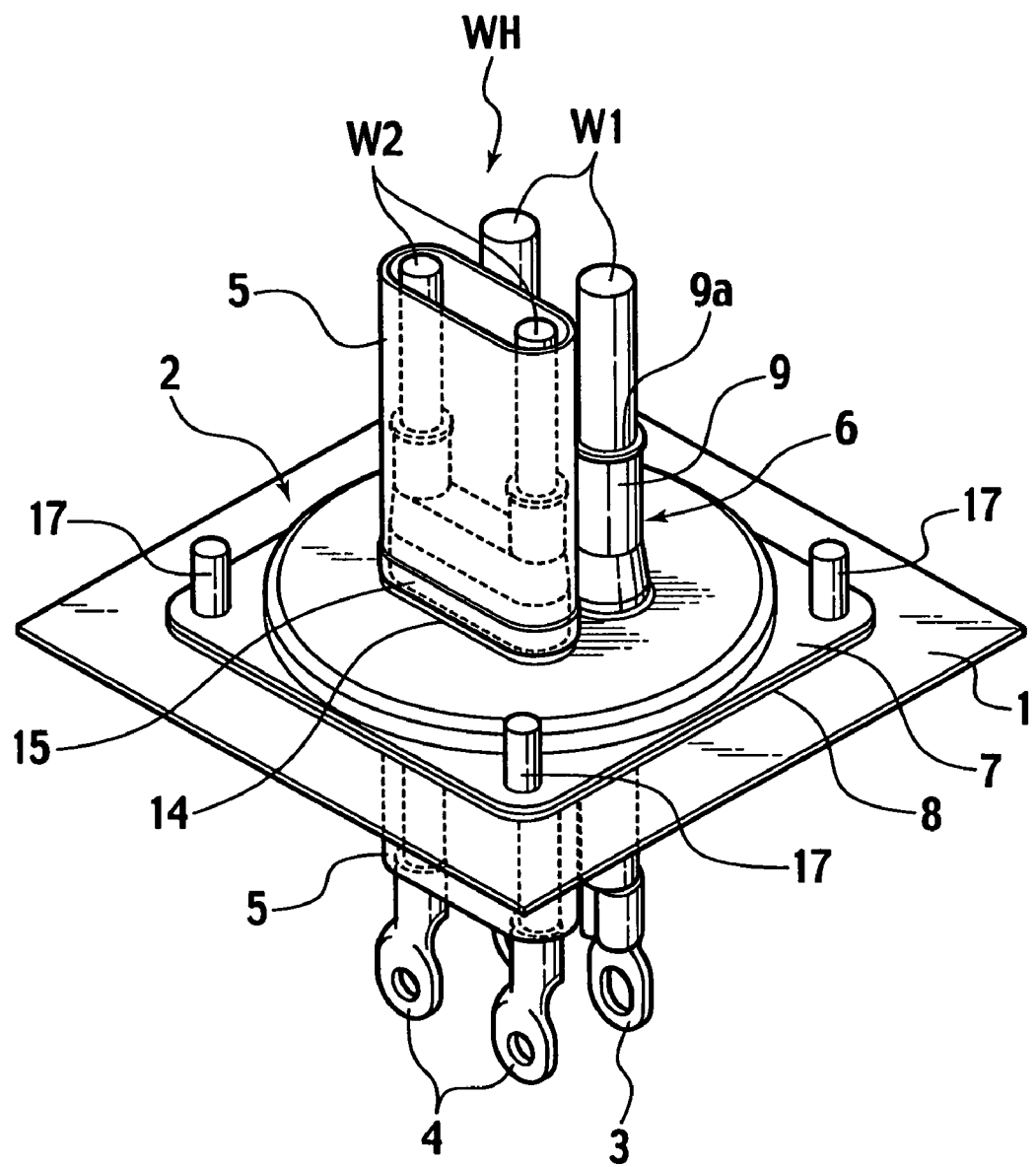
FIG. 2 is a perspective view of a grommet structure of one embodiment of the present invention as viewed diagonally from above.
Figure 3:
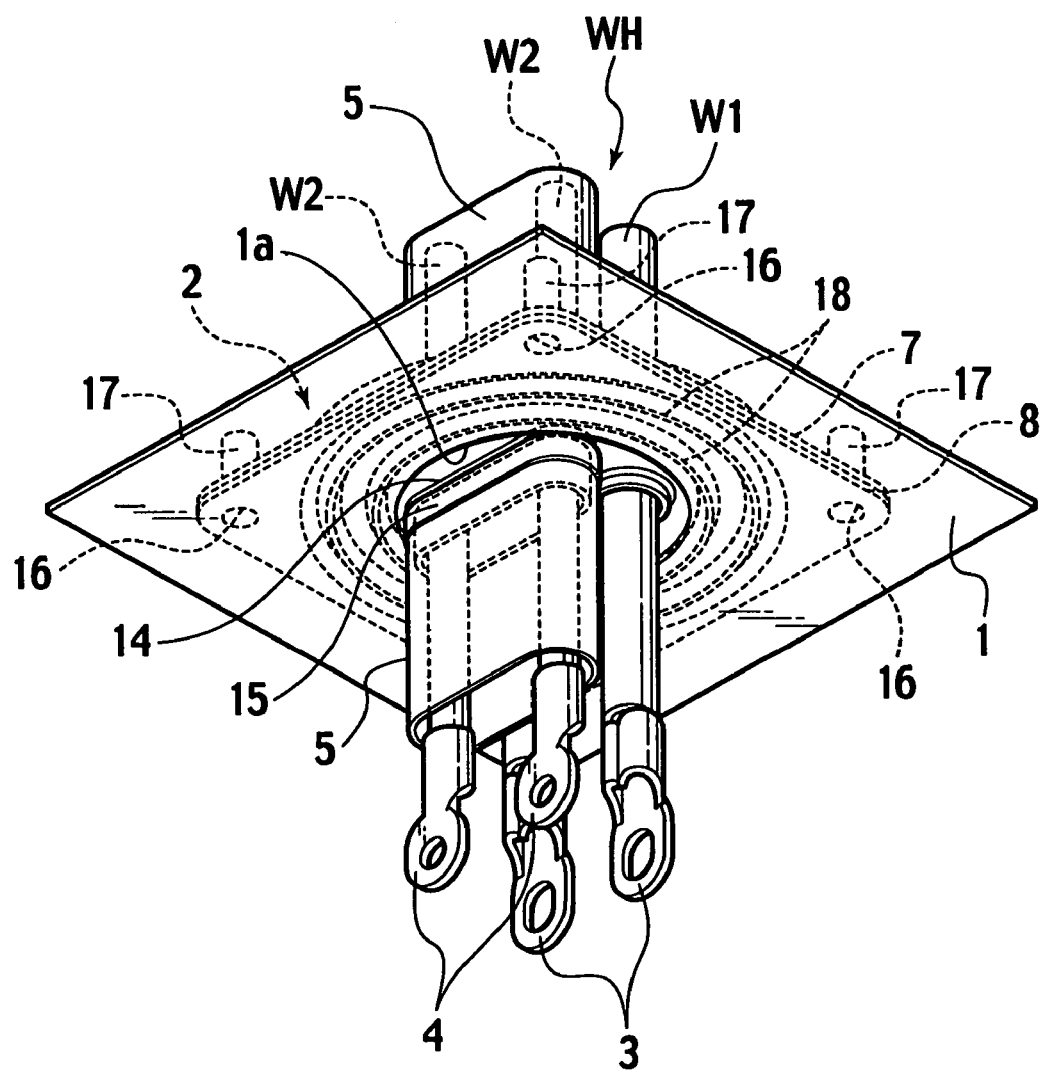
FIG. 3 is a perspective view of the grommet structure of the embodiment of the invention as viewed diagonally from below.
Figure 4:
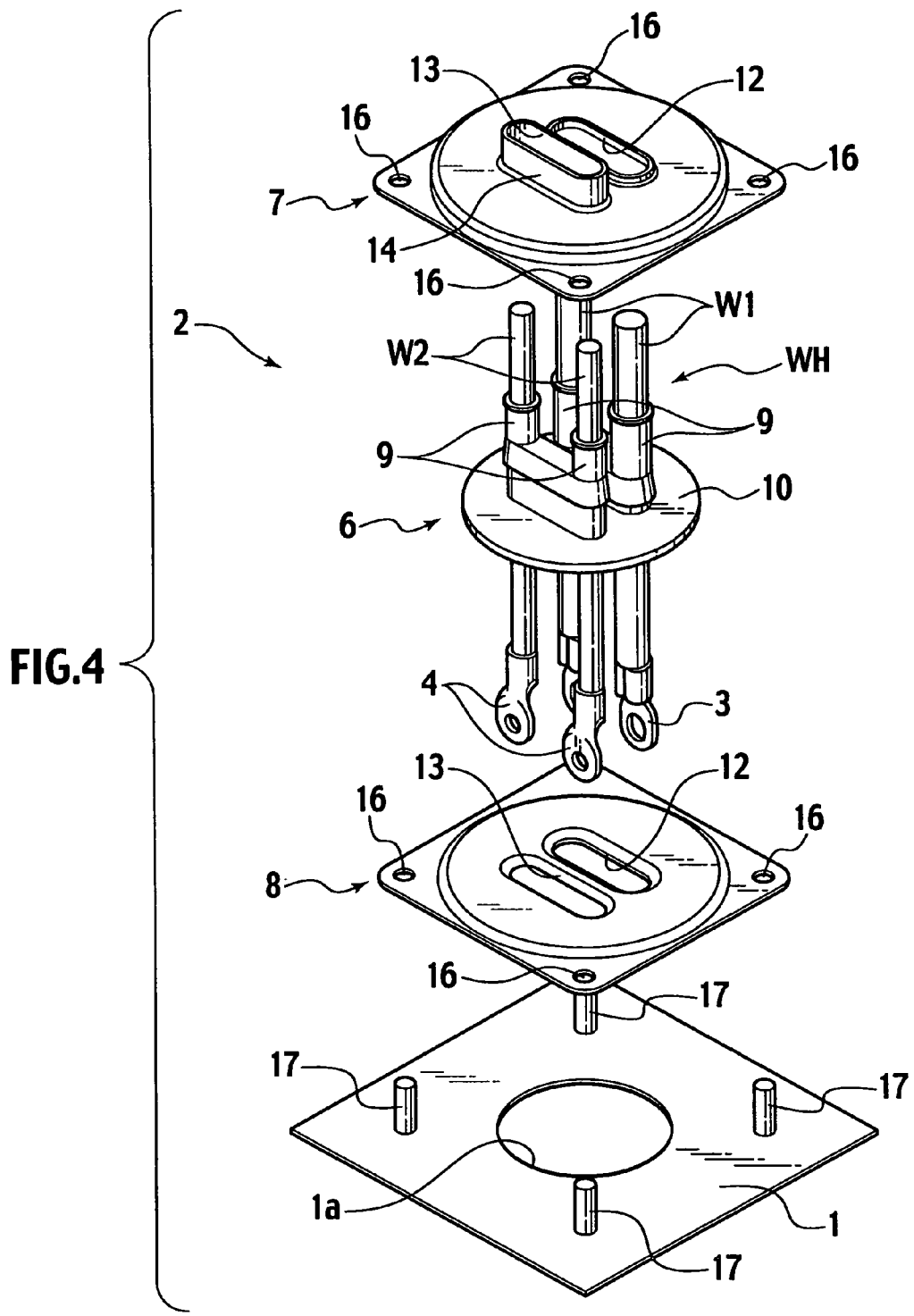
FIG. 4 is an exploded perspective view of a grommet structure of one embodiment of the invention as viewed diagonally from above.
Figure 5:
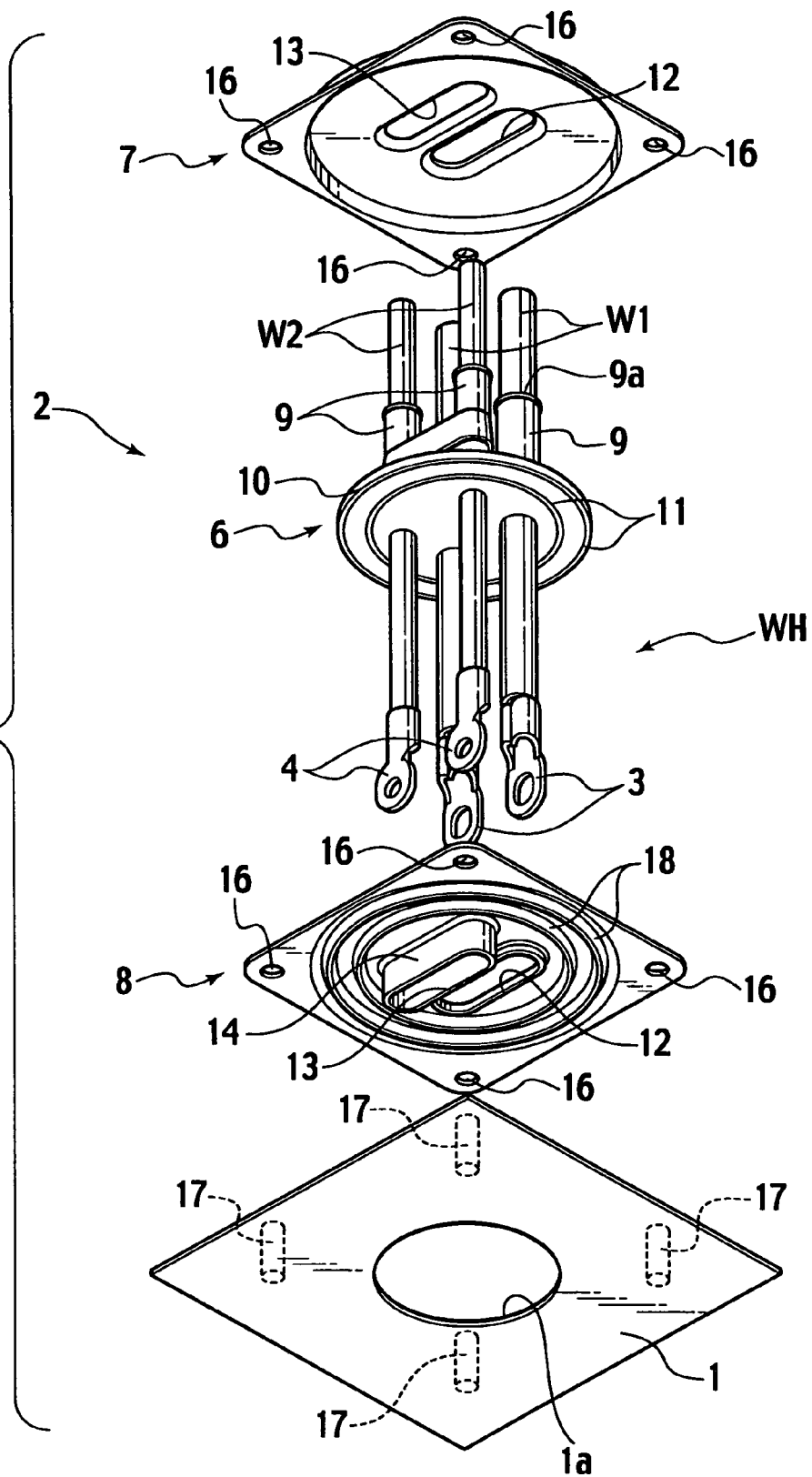
FIG. 5 is an exploded perspective view of the grommet structure of the embodiment of the invention as viewed diagonally from below.
Figure 6:
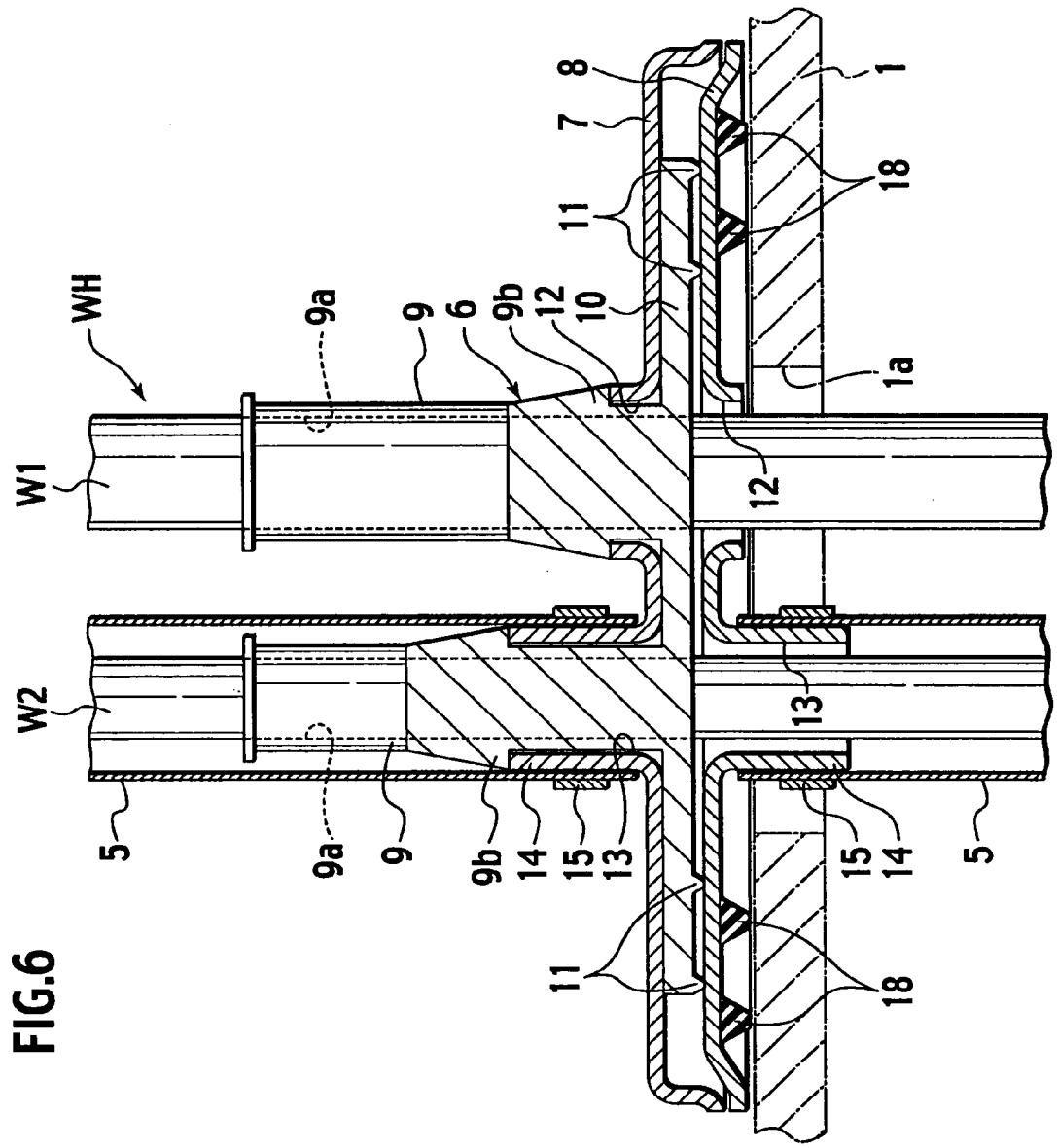
FIG. 6 is a sectional view of the grommet structure of the embodiment of the invention.

FIGS. 2 to 6 show one embodiment of the present invention. FIG. 2 is a perspective view of a grommet structure as viewed diagonally from above, FIG. 3 is a perspective view of the grommet structure as viewed diagonally from below, FIG. 4 is an exploded perspective view of a grommet structure of one embodiment of the invention as viewed diagonally from above, FIG. 5 is an exploded perspective view of the grommet structure as viewed diagonally from below, and FIG. 6 is a sectional view of the grommet structure.

As shown in FIGS. 2 to 6, a vehicle body panel 1 is a mounting panel which partitions the outside of the vehicle body (upper side from the vehicle body panel) and the inside of the vehicle body (lower side from the vehicle body panel). The vehicle body panel 1 is provided with an electric wire through hole 1a. The wire harness WH is laid in the electric wire through hole 1a. A grommet 2 is added to a portion of the wire harness WH which passes through the electric wire through hole 1a.

The wire harness WH includes two thick large current capacity electric wires W1, two thin small current capacity electric wires W2, and cylindrical braided wires 5 which are shield members for covering outer peripheries of the two electric wires W2. Large current capacity terminals 3 are fixed to one ends of the large current capacity electric wires W1, and small current capacity terminals 4 are fixed to one ends of the small current capacity electric wires W2. The electric wires W1 and the electric wires W2 are electromagnetically shielded by the braided wires 5. The braided wires 5 are separated from a position of the electric wire through hole 1a of the vehicle body panel 1. In this embodiment, the electric wires W1 is of 30 sq, and the electric wires W2 are of 15 sq.

The grommet 2 comprises a grommet body 6 made of elastic material such as rubber. The grommet body 6 holds the electric wires W1 and the electric wires W2. The grommet 2 also comprises a pair of shield shell covers 7 and 8 which are made of conductive material such as metal. The shield shell covers 7 and 8 function as portions of shield path, and fix the grommet body 6 to the vehicle body panel 1.

The grommet body 6 comprises four cylindrical electric wire fit press portions 9 formed with an electric wire press-fit hole 9a therein, and a disk-like flange 10 which is integrally provided on the four electric wire fit press portions 9. The electric wire fit press portions 9 are provided at their cylindrical lower (upper) ends with bevel stoppers 9b, respectively. The stoppers 9b limit the upper position of the shield shell cover 7, and prevent water coming from outside of the vehicle body from entering between the grommet body 6 and the upper shield shell cover 7.

The flange 10 is integrally formed at its lower surface with water-block projections 11 which are first water-blocks surrounding the entire periphery of four electric wire press-fit holes 9a. The water-block projections 11 are disposed in a form of double-ring having the common centers. The water-block projections 11 are brought into contact with the lower shield shell cover 8 under pressure by the sandwiching forces of the pair of shield shell covers 7 and 8.

The pair of shield shell covers 7 and 8 are the upper shield shell cover 7 and the lower shield shell cover 8. The shield shell covers 7 and 8 are formed at their same position with a large current capacity electric wire long through holes 12 and a small current capacity electric wire long through holes 13. The electric wires W1 into which the two electric wire fit press portions 9 of the grommet body 6 are press fitted is inserted through the large current capacity electric wire through holes 12. The electric wires W2 into which the two electric wire fit press portions 9 of the grommet body 6 are press fitted is inserted through the small current capacity electric wire through holes 13. Cylindrical long shield connecting portions 14 and 14 project from peripheries of the small current capacity electric wire through holes 13 of the shield shell covers 7 and 8. Tip end portions of the braided wires 5 which are separated by the shield connecting portions 14 and 14 are fixed by braiding stop belts 15 and 15.

The shield shell covers 7 and 8 are formed at their same positions with bolt holes 16 in four corners, and bolts 17 are inserted through the bolt holes 16 to fasten the shield shell covers 7 and 8 to the vehicle body panel 1.

An outer periphery of the upper shield shell cover 7 is bent downward, and its lower edge is disposed adjacent to an outer periphery of the lower shield shell cover 8. The lower shield shell cover 8 is provided at its lower surface with waterproof packings 18 by baking. The waterproof packings 18 are second water-blocks which surround the entire peripheries of the large current capacity electric wire through hole 12 and the small current capacity electric wire through hole 13. The waterproof packings 18 are disposed in a form of double-ring having the common centers. The waterproof packings 18 are brought into contact with the vehicle body panel 1 under pressure by the fastening forces of the bolts 17.

According to the grommet structure of the wire harness WH (i.e., wire harness WH having the grommet 2), since the braided wire 5 covering the small current capacity electric wires W2 is electrically connected to the vehicle body panel 1 through the pair of shield shell covers 7 and 8, the electromagnetic shielding path is secured. There is a possibility that water existing outside of the vehicle body enters inside the vehicle body through the electric wire through hole 1a of the vehicle body panel 1 via a gap between the electric wires W1 or W2 and the fit press portions 9 of the grommet body 6, a gap between the shield shell covers 7 and 8 and the grommet body 6, and a gap between the lower shield shell cover 8 and the vehicle body panel 1. However, water is reliably prevented from passing between the electric wires W1 or W2 and the grommet body 6 by the press fit structure built by the electric wire fit press portions 9, water is reliably prevented from passing between the grommet body 6 and the pair of shield shell covers 7 and 8 by the water-block projection 11, and water is reliably prevented from passing between the lower shield shell cover 8 and the vehicle body panel 1 by the waterproof packings 18. Unlike the conventional technique, it is unnecessary to charge the shield member, and the grommet structure can be produced only by assembling the parts. With this structure, electromagnetic shielding against the wire harness WH having the electric wires W2 covered with the braided wire 5 can be secured, water can reliably be blocked, and productivity is excellent.

In the above embodiment, the second water-block is the waterproof packings 18 provided on the lower shield shell cover 8. Therefore, the waterproof packings 18 can be provided easily as compared with a case where the second water-block is provided on the vehicle body panel 1. The second water-block may be provided on the vehicle body panel 1, or the second water-block may be provided on both the lower shield shell cover 8 and vehicle body panel 1.

Since the waterproof packings 18 is fixed to the lower shield shell cover 8 by baking in this embodiment, the waterproof packings 18 can easily be fixed.

Since the first water-block is the water-block projection 11 integrally formed on the grommet body 6 in this embodiment, the first water-block can be produced by forming the grommet body 6, and the first water-block can be produced easily. The first water-block may be provided on the lower shield shell cover 8 or the upper shield shell cover 7. The first water-blocks may be provided on both upper and lower surfaces of the grommet body 6, or may be provided on both the upper and lower shield shell covers 7 and 8.

Although the outer peripheries of the two small current capacity electric wires W2 are covered with the braided wire 5 in this embodiment, outer peripheries of the two large current capacity electric wires W1 may be covered with the braided wire 5, or the two small current capacity electric wires W2 and the two large current capacity electric wires W1 may be covered with independent braided wires 5. If both the electric wires W1 and W2 are covered with the independent braided wires 5, it is possible to prevent adverse influence from being exerted on not only between the electric wires W1 and W2, but also between other electric wires adjacent to each other.

In this embodiment, the grommet structure has the electric wires W1 which are not covered with the shield member in addition to the electric wires W2 covered with the shield member 5, and the grommet body 6 is provided with the electric wire fit press portions 9 into which the electric wires W1 are press fitted. Therefore, it is possible to secure electromagnetic shielding also against a wire harness WH in which electric wires W2 covered with the shield member 5 and electric wire W1 not covered with a shield member, and water can be blocked.

In the above description, the present invention is applied to the grommet structure of the wire harness WH in which the two large current capacity electric wires W1 and the two small current capacity electric wires W2 are mixed, but the invention can also be applied to a case where the wire harness WH has one large current capacity electric wire W1 and one small current capacity electric wire W2. The invention can be applied to a wire harness having an electric wire covered with a shield member.

While the shield member is formed of the braided wire 5 in this embodiment, other members can be also used only if they can shield electromagnetic forces.

Figure 7:
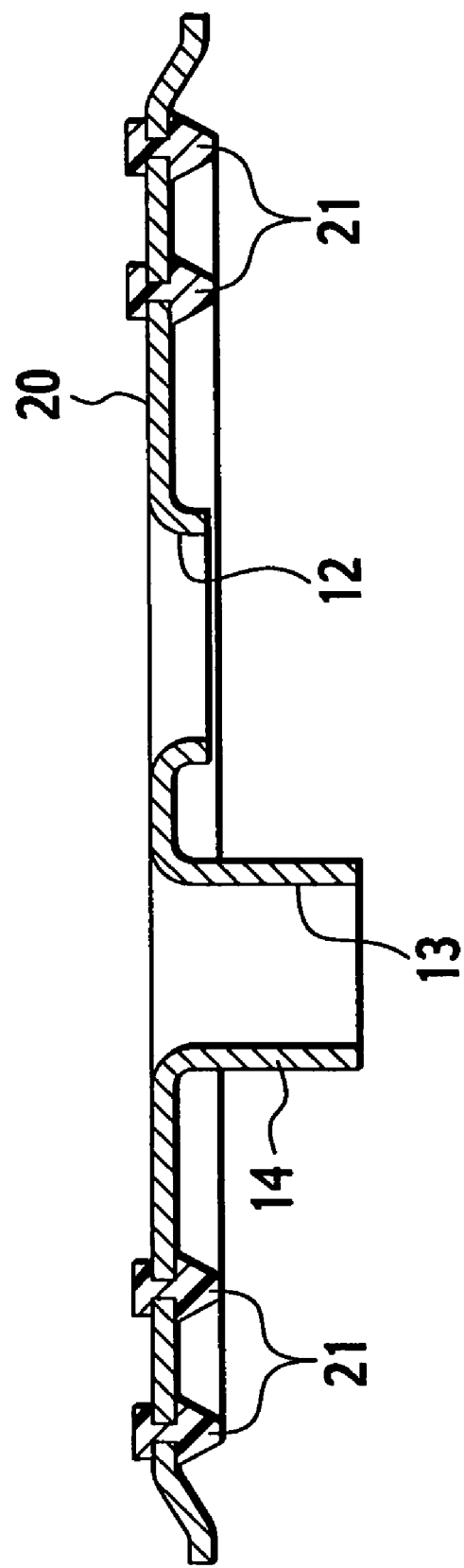
FIG. 7 is a sectional view of a modification of a lower shield shell cover.

FIG. 7 is a sectional view of a modification of a shield shell cover 20. As shown in FIG. 7, waterproof packings 21 which are second water-blocks are fixed to a lower surface of the shield shell cover 20 by outsert molding (In other words, outsert injection molding. A kind of insert injection molding.). Since other structure is the same as that of the above embodiment, detailed explanation will be omitted.

In this modification, since the waterproof packings 21 are fixed to the lower shield shell cover 20 by the outsert molding, the waterproof packings 21 can be fixed to the lower shield shell cover 20 such that the waterproof packings 21 are not easily fall and not deviated in positions.

One embodiments of the present invention has been explained above, but the present invention is not limited thereto, and various changes are possible within the scope of the present invention.

The entire contents of Japanese Patent Application, No. P2003-427777 (filed on Dec. 24, 2003) are incorporated herein by reference.

What is claimed is:

1. A grommet structure, comprising:
   an electric wire covered at its outer periphery with shield members which are separated at a position of an electric wire through a hole of a mounting panel;
   a grommet body having an electric wire press fit portion into which the electric wire is press fitted and a flange integrally provided on the electric wire press fit portion; and
   a pair of shield shell covers which respectively includes shield connecting portions to which ends of the shield members are connected and which sandwich the flange of the grommet body and which are fixed to a periphery of the electric wire through the hole of the mounting panel,
   wherein one of the grommet body and the pair of shield shell covers is provided with a first water-block to prevent water from passing between the grommet body and the pair of shield shell covers; and
   wherein one of the mounting panel and one of the shield shell covers which is in contact with the mounting panel is provided with a second water-block to prevent water from passing between the mounting panel and the one shield shell cover.

2. The grommet structure according to claim 1, wherein the second water-block is a waterproof packing which is provided on the one shield shell cover and projecting toward the mounting panel.

3. The grommet structure according to claim 2, wherein the waterproof packing is fixed to the one shield shell cover by baking.

4. The grommet structure according to claim 2, wherein the waterproof packing is fixed to the one shield shell cover by outsert molding.

5. The grommet structure according to claim 1, wherein the first water-block is a water-block projection which is integrally formed on the grommet body and projects toward at least one of the shield shell covers.

6. The grommet structure according to claim 1, further comprising:
   another electric wire which is not covered with a shield member in addition to the electric wire covered with the shield member,
   wherein the grommet body is provided with an electric wire fit press portion into which the electric wire not covered with a shield member is press fitted.

* * * * *